United States Patent [19]

Pelonis

[11] Patent Number: 5,133,042
[45] Date of Patent: Jul. 21, 1992

[54] AIR TREATMENT APPARATUS UTILIZING INTERCANGEABLE CARTIDGES

[76] Inventor: Kosta L. Pelonis, c/o Pelko Electric Corporation, Carborundum Center, Suite 484, 345 Third St., Niagara Falls, N.Y. 14303

[21] Appl. No.: 652,435

[22] Filed: Feb. 8, 1991

[30] Foreign Application Priority Data

Apr. 24, 1990 [FR] France .................... 90 05940

[51] Int. Cl.⁵ .......................... H05B 3/00; F24F 1/02
[52] U.S. Cl. .................... 392/365; 392/368; 392/390; 261/DIG. 65
[58] Field of Search .............. 392/360-369, 392/390; 261/DIG. 65; 165/50, 122, 125; 98/31.6; 219/474-476

[56] References Cited

U.S. PATENT DOCUMENTS

| 2,460,335 | 2/1949 | Buss . | |
|---|---|---|---|
| 2,628,083 | 2/1953 | Rense | 261/28 |
| 2,707,745 | 5/1955 | Farr et al. | 392/368 |
| 3,176,117 | 3/1965 | Knoll et al. | 392/365 |
| 4,035,451 | 7/1977 | Tringali | 261/101 |
| 4,571,485 | 2/1986 | Spector | 239/136 |
| 4,631,387 | 12/1986 | Glucksman | 420/125 |
| 4,695,434 | 9/1987 | Spector | 239/56 |
| 4,737,616 | 4/1988 | Wen-Ying | 219/472 |

FOREIGN PATENT DOCUMENTS

| 631511 | 6/1936 | Fed. Rep. of Germany . |
| 1604194 | 3/1966 | Fed. Rep. of Germany . |
| 2122336 | of 0000 | United Kingdom . |

Primary Examiner—Bruce A. Reynolds
Assistant Examiner—John A. Jeffery
Attorney, Agent, or Firm—Paul & Paul

[57] ABSTRACT

A single device adaptable to alter any one of a variety of air characteristics such as temperature, humidity, ion content, odor, etc. Several interchangeable cartridges are provided. Each cartridge has an apertured support structure, an air treatment element that alters a particular characteristic of an air flow through the cartridge, and male connectors. The device has a housing, a fan, and female connectors that cooperate with the male connectors to position any one of the cartridges on the housing to receive an air flow discharged from the fan. When interfitted, the connectors also complete an electric circuit to a power supply that provides current to any electrically-operable cartridge. A removable protective envelope contains the cartridge. The protective envelope has an arm that inserts through a housing slot to trip a switch controlling current flow from the power supply. When the protective envelope is removed, current flow to the cartridge is disabled, allowing safe handling of the cartridge. A push-button switch extending from the bottom of the housing disables current flow to the cartridge when the device is raised or inadvertently knocked over.

5 Claims, 2 Drawing Sheets

AIR TREATMENT APPARATUS UTILIZING INTERCANGEABLE CARTIDGES

FIELD OF THE INVENTION

The invention concerns apparatus and methods for altering the characteristics of the air in an environment, characteristics such as temperatures, odor, humidity, ion content and the like.

BACKGROUND OF THE INVENTION

A variety of devices are known that change the characteristics of the air in a room or the like. These include electric heaters, ionizers, deodorizers, and humidifiers. Such devices often comprise an electric fan that produces a flow of environmental air through elements that can appropriately alter the desired air characteristic. A shortcoming in the prior art is that distinct and separate devices are required to alter various characteristics.

SUMMARY OF THE INVENTION

The invention provides apparatus that is selectively adaptable to alter different characteristics of the air in an environment. An interchangeable cartridge is provided that comprises a support structure apertured to allow a flow of air through the cartridge and air treatment means attached to the support structure for altering a preselected characteristic of the air flow through the cartridge. The apparatus further comprises a housing, a fan mounted to the housing to draw air from the environment and create a pressurized air flow, the pressurized air flow being directed through the cartridge. In a presently preferred embodiment, the pressurized air flow is discharged from the fan and is subsequently directed through the cartridge. A mounting assembly releasably secures the support structure of the cartridge to the housing. By interchanging the cartridge with other cartridges having different air treatment means, the apparatus may be adapted to alter different characteristics of the air in the environment.

To permit use of electrically powered interchangeable cartridges, the apparatus preferably comprises a power supply and circuit-forming means that couple the air treatment means of a cartridge to the power supply contemporaneously with the securing of the cartridge to the housing. In preferred form, complementary male and female connectors are attached to the housing and cartridge. These define paired electrically conductive surfaces in complementary spacing arrangements. One pair of surfaces, associated with the housing, is connected to the power supply. Another pair of surfaces, associated with the cartridge, are connected to the air treatment means. The connectors simultaneously mount the cartridge in an operative orientation on the housing and contact the pairs of surfaces to complete a circuit between the power supply and the cartridge's air treatment means.

Interchangeable cartridges may be used to alter a variety of physical or chemical characteristics of air. These characteristics include temperature, humidity, odor (as with fragrant elements), purity (as, for example, with ozone generation or dispersing of aseptic agents), ion content, and direction of air flow (as with a cartridge formed with moving baffles). The installed cartridge may also be removed to allow the apparatus to function as a basic fan. A multiplicity of functions that were previously performed by separate and distinct devices are consequently achieved with a single basic apparatus embodying the invention. It is also contemplated that several cartridges may be installed, in series, each with a different function, to control several air characteristics simultaneously.

Other aspects of the invention will be apparent from a description below of a preferred embodiment and will be more specifically defined in the appended claims.

DESCRIPTION OF THE DRAWINGS

The invention will be better understood with reference to drawings, in which.

DESCRIPTION OF PREFERRED EMBODIMENT

Figure 1:
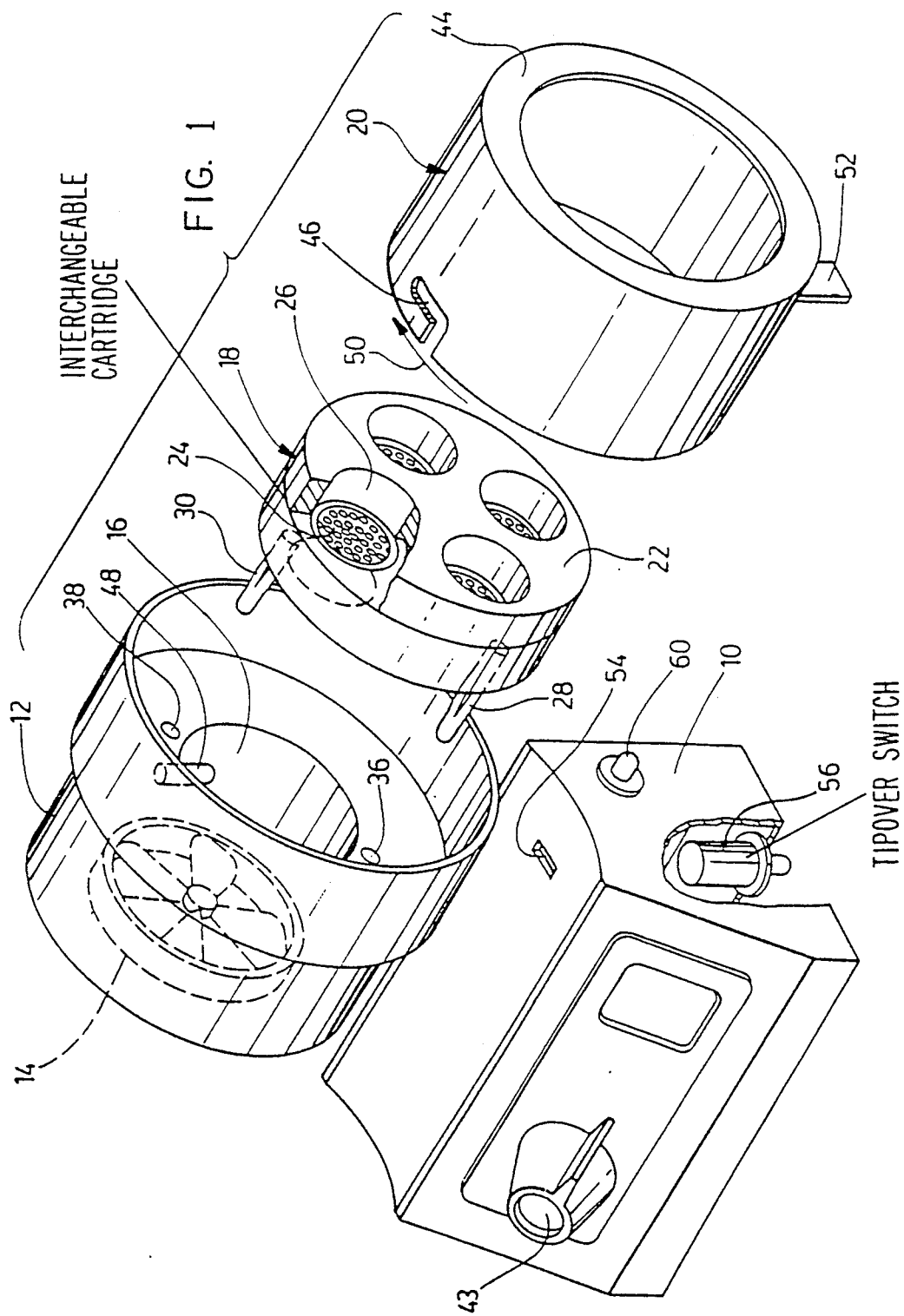
FIG. 1 is an exploded diagrammatic perspective view of air treatment apparatus of the present invention including an interchangeable cartridge formed with heating elements.

Reference is made to the exploded view of FIG. 1 which shows the principal components of an apparatus embodying the invention. The apparatus comprises a housing including a base portion 10 shaped to rest stably on a horizontal surface and a cylindrical portion 12 normally fixed on an upper part-cylindrical surface of the base portion 10. A conventional electric fan 14 is mounted within the cylindrical housing portion 12. The fan 14 draws air from the environment at the rear of the cylindrical housing portion 12 and discharges a pressurized air flow in a forward direction through a central passage 16. An interchangeable cartridge 18 adapted to heat the air flow is mounted in a releasable manner to the housing, forward of the fan 14. A protective envelope 20 mounts in a releasable manner to the housing to prevent inadvertent contact with the cartridge 18.

The cartridge 18 comprises a generally circular support structure 22 configured to retain a plurality of semiconductor elements, such as the element 24. These elements are formed with a multiplicity of apertures and are electrically powered to heat air passing through the apertures. The support structure 22 is formed with passages to receive and direct the fan 14 air flow through the heating elements, such as the passage 26 associated with the element 24. Electric current required to operate the elements is supplied through a pair of male banana-type connectors 28, 30. These connectors 28, 30 are fixed in a conventional manner to support structure 22 with a predetermined spacing. They have electrically conductive external surfaces (not separately indicated). These surfaces are coupled to the heating elements to permit current to be applied. Reference is made to prior U.S. Pat. No. 4,703,153, the teachings of which are incorporated herein by reference, that illustrates an exemplary method of electrically coupling terminals to opposing faces of such heating elements to supply necessary operating currents. Other methods of electrically connecting terminals comparable to the male connectors 28, 30 to such heating elements are well known in the art.

Figure 3:
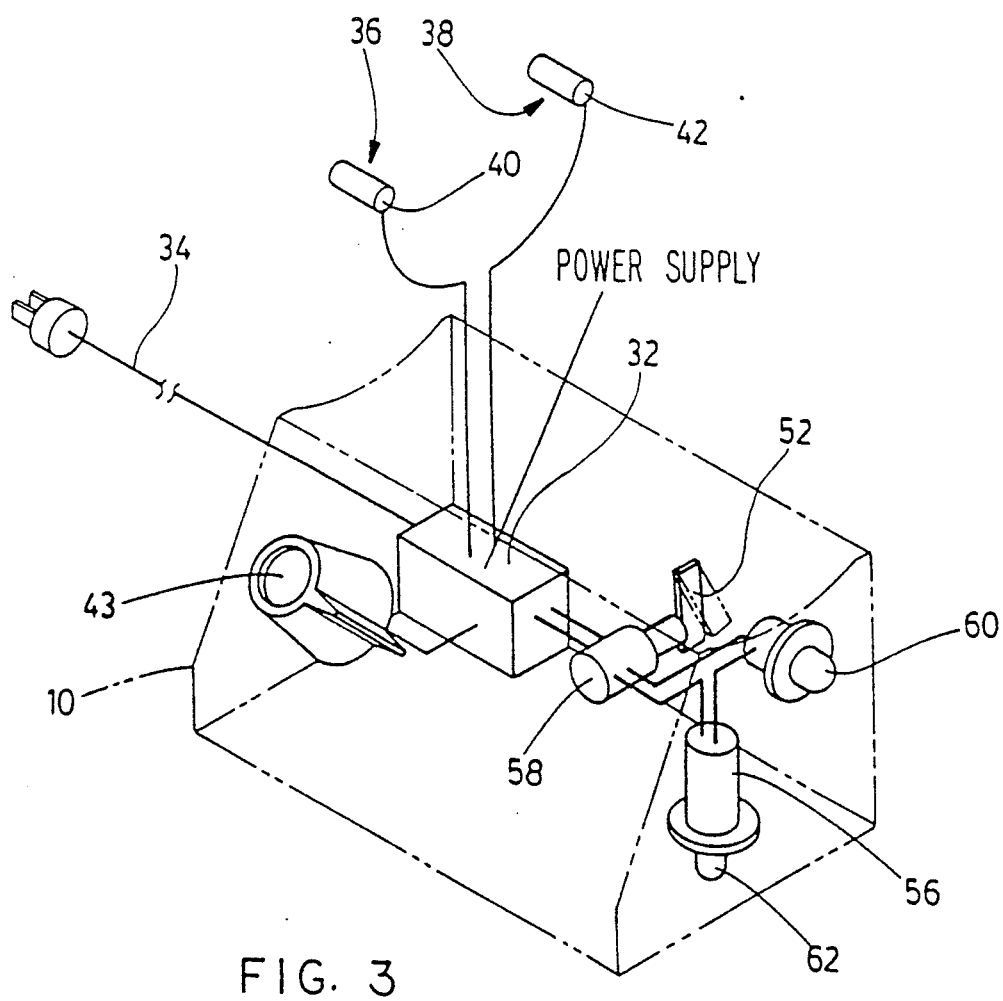
FIG. 3 diagrammatically illlustrates a power supply associated with the apparatus of FIG. 1 and switches that regulate current flow from the power supply.

The housing base portion 10 contains a power supply 32 (illustrated in FIG. 3). This is operated with line voltages and is connected to a conventional power cord 34 for such purposes. The power supply 32 is connected by wiring to recessed female banana-type connectors 36, 38 with a predetermined spacing complementary to that of the male connectors 28, 30 of the cartridge 18. The female connectors 36, 38 define a pair of internal cylindrical electrically conductive surfaces 40, 42 (diagrammatically illustrated in FIG. 3) between which the power supply 32 produces a voltage difference. The internal surfaces 40, 42 are dimensioned to closely receive the male connectors 28, 30 in interfitting relationship. The male and female connectors 36, 38 serve dual functions. First, they constitute a mounting assembly for releasably securing the cartridge 18 to the housing. Second, they simultaneously form a circuit between the heating elements and the power supply 32 permitting operation of the heating elements. The power supply 32 may be regulated with a conventional control 43 mounted on the housing base portion 10.

The protective envelope 20 is generally cylindrical. It has a forward circular flange 44 against which a protective grill (not illustrated) may be mounted. It is formed with a groove 46 that is open to receive a projection or lug 48 attached to the cylindrical housing portion 12. Once the lug 48 is engaged with the groove 46, the envelope 20 may be rotated through a limited predetermined angle in a clockwise direction (indicated by the arrow 50 in FIG. 1) to secure the envelope 20 to the housing. Rotation in an opposite direction returns the envelope 20 to a position in which it can be immediately removed from the housing. The envelope 20 is formed with an arm 52 that extends through a slot 54 in the upper surface of the housing base portion 10 into the interior of the housing where the power supply 32 is located. The arm 52 rotates with the envelope 20 during mounting and removal, and functions as a control member for actuating a switch, as described more fully below.

A pair of switches 56, 58 located within the housing base portion 10 are in circuit with the power supply 32. Each of the switches 56, 58 has an open state in which it disables current flow from the power supply 32 to the female connectors 36, 38 and ultimately to the installed cartridge 18. Each has a closed state in which it permits the current flow required for cartridge operation. If either switch is open, the power supply 32 is effectively disabled. An indicator light 60 in circuit with the power supply 32 and switches 56, 58 provides a visual indication of whether current is being supplied to the cartridge 18. The fan 14 may be connected independently to the power supply 32 to permit use of the apparatus simply as a fan, when no cartridge is present.

The switch 56 is a spring-biased, push-button switch vertically mounted within the housing base portion 10. It has a button 62 that extends through the bottom surface of the housing base portion 10. When the base portion 10 is rested on a flat surface, the button 62 contacts the surface and trips the switch 56 to a closed state, permitting current flow from the power supply 32. If the apparatus is raised or inadvertently knocked over, the button 62 extends and returns the switch 56 to an open state, disabling current flow. This prevents operation of the apparatus unless it is properly oriented and provides a safeguard against fire hazards.

The other switch 58, which is similar to the switch 56, is positioned to cooperate with the arm 52 of the envelope 20. When the envelope 20 is rotated counter-clockwise to its removal position, the arm 52 is rotated to a position in which it is disengaged from the switch 58 (shown in phantom outline in FIG. 3). The switch 58 then opens and disables current flow from the power supply 32. When the envelope 20 is rotated from its removal position clockwise to a position in which it is secured to the housing, the arm 52 rotates from its supply disabling position to a position in which it engages the switch 58 (shown in solid out line in FIG. 3). This closes the switch 58 and enables current flow from the supply. Accordingly, when the envelope 20 is positioned for removal, power is no longer supplied to the cartridge 18. This ensures that even an inexperienced user will not endanger himself when interchanging cartridges or replacing a defective cartridge 18.

Figure 2:
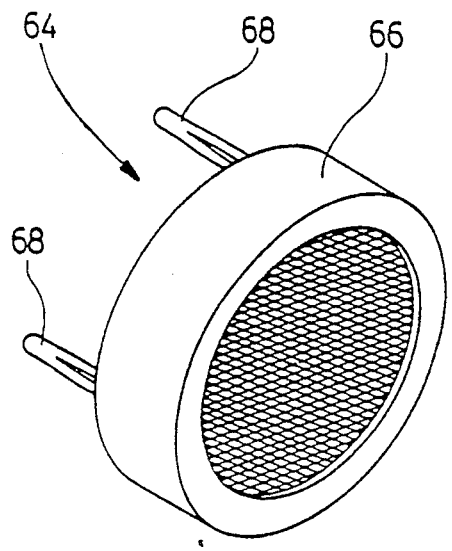
FIG. 2 is a perspective view of an alternative interchangeable cartridge.

A second cartridge 64 interchangeable with the heating cartridge 18 is shown in FIG. 2. This cartridge 64 comprises a support structure 66 apertured to direct airflow from the fan 14 through an air treatment element (not shown) in its interior. That element may, for example, be an ionizing element. The support structure 66 is generally cylindrical with a diameter comparable to that of the support structure 22 associated with the heating cartridge 18. The support structure 66 has a similar pair of male banana-type connectors 68, 70 in the same spacing arrangement associated with the pair of male connectors 28, 30 of the heating cartridge 18. The male connectors 68, 70 are electrically connected to the air treatment element in the interior in a conventional manner.

The user simply determines what air treatment function he requires the apparatus to perform. He then selects the appropriate one of the cartridges. The protective envelope 20 is removed, and the selected cartridge is installed by means of the banana-connector mounting assembly. The electric circuit necessary to power the selected cartridge is automatically completed. Other cartridges performing different functions may be provided so that the single apparatus can perform a wide range of air treatment functions.

It will be appreciated that a particular embodiment of the invention has been described and that modifications may be made therein without departing from the spirit of the invention or necessarily departing from the scope of the appended claims.

I claim:

1. Air treatment apparatus selectively adaptable to alter different characteristics of air in an environment, the apparatus comprising:
    (a) a housing;
    (b) a fan operably mounted to the housing to create a pressurized air flow;
    (c) an interchangeable cartridge comprising a support structure apertured to allow a flow of air through the cartridge, the cartridge further comprising air treatment means attached to the support structure for altering a preselected characteristic of the air flow through the cartridge, the pressurized air flow of the fan being subsequently directed through the cartridge, the air treatment means of the cartridge being electrically-powered, the air-treatment means comprising:
        (1) a power supply contained within the housing; and
        (2) circuit-forming means coupling the air treatment means to the power supply whenever the mounting assembly secures the support structure of the cartridge to the housing, the circuit-forming means, comprising:
            a first pair of electrically conductive surfaces located on the housing and electrically connected to the power supply;

a second pair of electrically conductive surfaces located on the cartridge and electrically connected to the air treatment means;

the first and second pairs of electrically conductive surfaces being positioned to engage one another whenever the mounting assembly secures the support structure of the cartridge to the housing;

(d) a mounting assembly for releaseably securing the support structure of the cartridge to the housing, the mounting assembly comprising a pair of male connectors and a pair of recessed female connectors shaped to closely receive the male connectors, the pair of male connectors being attached to one of the housing and the support structure of the cartridge, the pair of female connectors being attached to the other of the housing and the support structure of the cartridge, each of the male connectors defining a different one of the first pair of electrically conductive surfaces, and each of the female connectors defining a different one of the second pair of electrically conductive surfaces;

(e) a protective envelope shaped to surround the cartridge;

(f) envelope mounting means for releaseably securing the protective envelope to the housing thereby to surround the cartridge, the mounting means permitting displacement of the envelope between a first position in which the envelope is secured to the housing and a second position in which the envelope is removeable from the housing, the envelope mounting means comprising one of a groove and projection formed on the envelope and the other of a groove and projection formed on the housing, the groove and projection being shaped such that the envelope rotates through a predetermined angle between its first and second positions when the projection is received in the groove;

(g) a switch in circuit with the power supply, the switch having a first state in which the switch enables current flow from the power supply to the air treatment means and a second state in which the switch disables current flow from the power supply to the air treatment means; and (h) a control member fixed to the envelope, the control member being so positioned relative to the envelope and relative to the switch that the control member orients the switch in its first state as the envelope is displaced from its second position to its first position and orients the switch in its second state as the envelope displaces from its first position to its second position, the switch being located within the housing and the control member extending into the housing through a slot formed in the housing, the control member rotating with the mounting member such that the control member contacts the switch as the envelope rotates toward its first position and disengages from the switch as the envelope rotates toward its second position; whereby, interchanging the cartridge with other cartridges having different air treatment means adapts the apparatus to alter different characteristics of the air in the environment.

2. The apparatus of claim 1 further comprising a push-button switch located within the housing and in circuit with the power supply, the switch having a first state in which the switch enables current flow from the power supply to the air treatment means and a second state in which the switch disables current flow from the power supply the air treatment means, the switch extending through a bottom surface of the housing in such an orientation that the switch assumes its first state when the switch contacted a flat surface on which the bottom surface of the housing rests and assumes its second state when the bottom surface of the housing is separated from the flat surface.

3. Apparatus for altering at least one characteristic of the air in an environment, comprising:

(a) a housing;

(b) a power supply located within the housing;

(c) a fan mounted to the housing, the fan being coupled to the power supply to produce an air flow from air in the environment;

(d) a first pair of electrically conductive surfaces attached to the housing and coupled to the power supply such that the power supply produces a voltage difference between the first pair of electrically conductive surfaces;

(e) a cartridge comprising:
  (1) a support structure apertured to allow a flow of air through the cartridge;
  (2) electrically-operable air treatment means attached to the support structure for altering a predetermined characteristic of the air flow through the cartridge; and
  (3) a second pair of electrically conductive surfaces electrically connected to the air treatment means;

(f) mounting means for releaseably securing the cartridge to the housing such that the air flow form the fan is directed through the cartridge, mounting means comprising:
  (1) a pair of male connectors attached to one of the housing and the support structure of the cartridge, each of the male connectors defining a different one of the first pair of electrically conductive surfaces; and
  (2) a pair of recessed female connectors shaped to closely receive the male connectors and attached to the other of the housing and the support structure of the cartridge, each of the female connectors defining a different one of the second pair of electrically conductive surfaces; the first and second paris of electrically conductive surfaces being positioned to engage one another whenever the mounting means secure the support structure of the cartridge to the housing;

(g) a protective envelope shaped to surround the cartridge;

(h) envelope mounting means for releasable securing the protective envelope to the housing thereby to surround the cartridge, the mounting means permitting displacement of the envelope between a first position in which the envelope is secured to the housing and a second position in which the envelope is removeable from the housing, the envelope mounting means comprising one of a groove and projection formed on the envelope and the other of a groove and projection formed on the housing, the groove and projection being shaped such that the envelope rotates through a predetermined angle between its first and second positions when the projection is received in the groove;

(i) a switch in circuit with the power supply, the switch having a first state in which the switch enables current flow from the power supply to the air treatment means and a second state in which the switch disables current flow from the power supply to the air treatment means; and (j) a control member fixed to the envelope, the control member being so positioned relative tot he envelope and relative to the switch that the control member orients the switch in its first state as the envelope is displaced from its second position to its first position and orients the switch in its second state as the envelope displaces from its first position to its second position, the switch being located within the housing and the control member extending into the housing through a slot formed in the housing, the control member rotating with the mounting member such that the control member contacts the switch as the envelope rotates toward its first position and disengages from the switch as the envelope rotates toward second position.

4. The apparatus of claim 3 comprising a spring-biased push-button switch located within the housing and in circuit with the power supply, the switch having a first state in which the switch enables current flow from the power supply to the air treatment means and a second state in which the switch disables current flow from the power supply to the air treatment means, the switch extending through a bottom surface of the housing in such an orientation that the switch assumes its first state when the switch contacts a flat surface on which the bottom surface of the housing rests and assumes its second state when the bottom surface of the housing is separated from the flat surface.

5. A method of adapting a single apparatus to alter any selected one of a plurality of different characteristics of air in an environment, comprising:

providing a plurality of interchangeable cartridges, each cartridge comprising a support structure apertured to allow a flow of air through the cartridge and comprising air treatment means attached to the support structure for altering a preselected characteristic of air flow through the cartridge, the air treatment means of each of the plurality of cartridges being selected to alter a different one of the plurality of different characteristics of the air flow through the cartridge;

providing the single apparatus with a fan for creating a pressurized air flow and with means for releaseable receiving any one of the plurality of cartridges in a predetermined orientation such that the air flow is directed through the cartridge; and, selecting one of the plurality of cartridges comprising air treatment means that alter the selected on of the characteristics and receiving the selected cartridge in a predetermined orientation in the releaseable receiving means of the single apparatus; and the air treatment means of each of the plurality of cartridges being electrically powered, and comprising:

forming a pair of electrically conductive surfaces in a predetermined spacing arrangement on the apparatus and electrically connecting the pair of electrically conductive surfaces to a power supply thereby to produce a voltage difference between the pair of surfaces;

forming each of the cartridges with a pair of electrically conductive surfaces electrically connected to the air treatment means of the cartridge in a spacing arrangement complementary to the spacing arrangement of the pair of electrically conductive surfaces on the apparatus such that any one of the plurality of cartridges is in circuit with the power supply when received in the predetermined orientation by the releaseable receiving means.

* * * * *